US007642919B2

(12) United States Patent
Leal et al.

(10) Patent No.: US 7,642,919 B2
(45) Date of Patent: Jan. 5, 2010

(54) SIGNALLING AND LOCALIZATION DEVICE FOR AN INDIVIDUAL IN THE SEA AND METHOD OF USE THEREOF

(76) Inventors: Stephane Leal, 59 Chemin de la Tassine, Saint-Genis-Lavel (FR) 69230; Jean-Yves Besson, Avenue Noel Verlaque, Le Castel Fleury, La Seyne sur Mer (FR) 83500

( * ) Notice: Subject to any disclaimer, the term of this patent is extended or adjusted under 35 U.S.C. 154(b) by 319 days.

(21) Appl. No.: 11/815,940

(22) PCT Filed: Feb. 9, 2006

(86) PCT No.: PCT/FR2006/050112

§ 371 (c)(1),
(2), (4) Date: Aug. 9, 2007

(87) PCT Pub. No.: WO2006/085030

PCT Pub. Date: Aug. 17, 2006

(65) Prior Publication Data

US 2008/0062816 A1   Mar. 13, 2008

(30) Foreign Application Priority Data

Feb. 10, 2005   (FR)   ................... 05 50395

(51) Int. Cl.
*G08B 23/00* (2006.01)
(52) U.S. Cl. .............. 340/573.1; 340/573.4; 340/573.6; 340/539.13; 340/539.26; 340/574; 340/850; 340/984; 342/357.07; 342/357.09; 367/131; 367/118; 367/910
(58) Field of Classification Search .............. 340/573.1, 340/573.4, 573.6, 574, 539.13, 539.26, 850, 340/984; 342/357.07, 357.09; 367/131, 367/118, 910
See application file for complete search history.

(56) References Cited

U.S. PATENT DOCUMENTS

| 4,305,143 | A | * | 12/1981 | Simms et al. ............... 367/134 |
| 4,714,914 | A | * | 12/1987 | Boe ........................ 340/573.1 |
| 4,813,025 | A | | 3/1989 | Rowland et al. |
| 5,185,605 | A | | 2/1993 | Roberts et al. |
| 5,463,598 | A | | 10/1995 | Holland et al. |

(Continued)

FOREIGN PATENT DOCUMENTS

DE     4306773     9/1994

(Continued)

*Primary Examiner*—Tai T Nguyen
(74) *Attorney, Agent, or Firm*—Cantor Colburn LLP (57) ABSTRACT

Signalling and localisation device for an individual in the sea, including
an ultrasonic wave transmitter constituting an individual alarm unit carried by the individual in the sea designed to transmit carrier waves of primary signals; a surface surveillance means arranged on the surface of the sea and provided with: a submersed antenna capable of picking up the primary signals transmitted by individual alarm unit;
means of transmitting secondary ultrasonic signals, these transmission means: means capable of calculating the position of individual alarm unit as a function of the ultrasonic signals received in response to secondary ultrasonic signals and of converting this information into the coordinates of a global positioning system;
a unit for transmitting radio waves capable of sending signals representing these coordinates to a mobile or fixed alarm processing centre equipped with a radio receiver.

14 Claims, 3 Drawing Sheets

U.S. PATENT DOCUMENTS

| | | |
|---|---|---|
| 5,570,323 A | 10/1996 | Prichard et al. |
| 5,650,770 A | 7/1997 | Schlager et al. |
| 5,886,635 A | 3/1999 | Landa et al. |
| 6,057,759 A * | 5/2000 | Marsh .................. 340/539.11 |
| 6,222,484 B1 | 4/2001 | Seiple et al. |
| 6,272,073 B1 | 8/2001 | Doucette et al. |
| 2005/0012663 A1 | 1/2005 | Audren et al. |

FOREIGN PATENT DOCUMENTS

| | | |
|---|---|---|
| EP | 1178328 | 2/2002 |
| FR | 2740426 | 4/1997 |
| FR | 2832246 | 5/2003 |
| FR | 2851340 | 8/2004 |
| JP | 10081297 | 6/1998 |

* cited by examiner

SIGNALLING AND LOCALIZATION DEVICE FOR AN INDIVIDUAL IN THE SEA AND METHOD OF USE THEREOF

FIELD OF THE INVENTION

The present invention relates to a signalling device designed to allow fast, automatic localisation of an individual in the sea. In particular, such a device makes it possible to locate a person wearing such a transmitter who has fallen in the sea or a scuba diver with the aim of indicating, as quickly as possible, the person's position to ships and rescuers dispatched to the area by sea or by air or to a dive ship at the site.

The present invention also relates to a signalling method designed to allow fast, automatic localisation of a man overboard wearing part of the device in question.

DESCRIPTION OF THE PRIOR ART

In the maritime field, especially in the case of search and rescue at sea, it is often indispensable and even vital to be able to locate people who are in the sea accurately and quickly, for example divers accompanied by a ship, especially persons who have accidentally fallen into the sea or windsurfers who must be saved as quickly as possible. The application which imposes the most demanding constraints in terms of urgency is obviously locating a person who has had an accident. The explanation of this invention is therefore more detailed in relation to this application, but those skilled in the art are easily capable of applying the teaching of this patent to other applications, regardless whether or not they are explicitly explained.

The increased popularity of water sport activities and changes in them are resulting in an increasing number of accidents every year which are often made more serious by the fact that the victims of such accidents are sometimes far out at sea, i.e. incapable of reaching a place of safety by their own means, regardless whether it be the bridge of a ship or the closest shore. In this type of critical situation it is obviously indispensable to locate the person so that rescuers can be directed effectively. However, the time taken to locate an accident victim is, besides climatic conditions and the ability of a person to survive immersion in water, a decisive factor in determining whether or not search and rescue is successful.

The use of signalling devices which use high-frequency electromagnetic radio waves to achieve this is known. In such devices, the high-frequency waves are emitted by a transmitter worn by a person and received by a radio receiver of a stand-by station or global positioning system satellite such as the systems known as GPS or Galileo.

However, although such systems can be miniaturized so that they can be built into a unit which can be carried by the user, they have one crippling drawback when it is a matter of life and death, in cold waters for instance; because of the type of satellites involved which are geostationary and transmit signals capable of being detected, localisation can take anything from five minutes to several hours.

In addition and as emphasized, for example by the teachings of documents FR-A-2 832 246 and U.S. Pat. No. 5,886,635, radio waves do not propagate in water. It is therefore necessary to make provision to equip the person with a means of flotation for the radio transmitter. In fact, when a person is partially and/or temporarily immersed in water, receivers cannot receive a distress signal emitted underwater and this may occur despite the means of flotation, especially in strong seas. In such cases, these devices are virtually useless because waves also obstruct the propagation of radio waves.

BRIEF SUMMARY OF THE INVENTION

Such systems are even more unusable for locating divers in the water. As far as their use for search and rescue is concerned, in addition to their effectiveness being limited by immersion of the transmitter, such systems also have the disadvantage of being bulky because the means of flotation must, according to Archimedes law, take up a certain amount of space in order to fulfill its function, regardless of its density. This bulkiness can impede a crew member who is expected to participate in maneuvering a ship.

In addition, signalling devices with transmitters which emit ultrasonic waves, i.e. acoustic waves having frequencies in excess of 20 kHz, are known. Such devices are suitable for communicating information and possibly alerts between divers or between a diver and a nearby boat, especially the diver's accompanying boat.

Document FR-A-2 740 426 describes a signalling device which uses an ultrasonic wave transmitter. Although such devices make communication of information possible, they do not make localisation by the associated receiver possible nor do they make it possible to relay the alarm signal to a search and rescue organization.

Moreover, documents EP-A-1 178 328 and U.S. Pat. No. 6,272,073 describe signalling devices which use an ultrasonic wave transmitter and allow communication of information as well as localisation by the receiver associated with a distress signal transmitter.

However, these devices do not make it possible to obtain fast, automatic alerting, i.e. without human intervention, of distant search and rescue organizations which are often on land. The search and rescue facilities on board a boat which accompanies divers may prove to be inadequate in certain situations and the speed with which an alarm signal can be relayed by a crew member may be too slow or this may even be impossible in the event of capsizing.

In addition, the devices described require deliberate action on the part of the man overboard who must therefore be sufficiently conscious to trigger transmission of a distress signal by his transmitter. A person who has fallen into the water is not always conscious and, due to the effects of panic or the effort involved in treading water, the person may simply fail to send an SOS.

The invention provides a signalling device and a signalling method designed to allow fast, automatic localisation of a man overboard, especially for persons capable of assisting the person in distress.

The invention provides a signalling device designed to allow fast, automatic localisation of an individual in the sea, comprising:

an ultrasonic wave transmitter constituting an individual alarm unit carried by the individual in the sea, or likely to fall in the sea, designed to produce isotropic radiation of carrier waves of primary signals;

a surface surveillance means arranged on the surface of the sea and provided with:
  a submersed antenna for receiving the primary signals transmitted by the individual alarm unit,
  means of transmitting secondary ultrasonic signals, this means of transmission being triggered essentially by the submersed antenna receiving primary signals;
  means capable of calculating the position of the individual alarm unit as a function of the ultrasonic signals received in response to the secondary ultrasonic signals and of converting this information into the coordinates of a global positioning system such as the GPS;

a unit for transmitting radio waves capable of sending signals representing these coordinates to a mobile or fixed alarm processing centre equipped with a radio receiver.

In this way, a person equipped with a transmitter built into such a signalling device can be located quickly and automatically by interchange of signals and, on this basis, be rescued or simply located straightforwardly and quickly.

The surface surveillance means acts as a relay receiver or a re-transmitter.

According to the invention, the antenna mounted on the surface surveillance means can be a multiple antenna or have a specific surface area.

In addition, according to the invention, the individual alarm unit is equipped with:
- means of automatically or manually triggering the transmission of primary ultrasonic signals;
- means of automatically triggering ultrasonic signals in response to the secondary signals transmitted by the relay receiver consisting of the surface surveillance means.

According to one advantageous embodiment of the invention, the means of automatically triggering ultrasonic transmission comprises a system capable of detecting the immersion state of a least one area of the transmitter, such as a wet switch for example.

According to another practical embodiment of invention, the individual alarm unit comprises:
- a self-contained electric power source, possibly comprising a storage battery;
- an ultrasonic wave emission source;
- a depth measuring unit;
- a microprocessor;
- a temperature sensor capable of measuring the temperature of the water and reporting it to the microprocessor;
- non-volatile memory designed to record the parameters of the transmitted and received signals.

This memory may also include means of personalising said unit with this means possibly consisting of a code number traditionally assigned to the integrated circuit and capable of being used in the individual alarm unit.

In practice, the surface surveillance means is attached to a buoy or a surface vessel, typically a boat, and has a submerged part which accommodates the antenna(s) that transmit and receive ultrasonic waves and a non-submerged part which accommodates the means of radio transmission.

Also, the invention relates to a signalling procedure designed to allow fast, automatic localisation of an individual in the sea, consisting of:
- deliberately or automatically, depending on prevailing circumstances, causing activation of an individual alarm unit carried by a person who is in the sea so as to trigger isotropic transmission of primary signals using ultrasonic waves;
- picking up said primary signals and, in return, producing secondary ultrasonic signals capable of causing, in turn and in response, repeat transmission of signals by ultrasonic means from said individual alarm unit so as to enable localisation of the individual in the sea carrying the individual alarm unit which transmits said primary signals;
- processing the signals received in response to the secondary ultrasonic signals in order to determine the position of the individual in the sea as coordinates of a global positioning system such as the GPS;
- transmitting signals that represent these coordinates by radio so as to indicate the location of the individual in the sea and, if applicable, trigger ad hoc search and rescue operations.

According to one embodiment of the invention, transmission of the primary signals comprises two successive phases:
- a first phase which starts immediately after activation of the individual alarm unit during which the primary signals are transmitted at low power and are timed at regular or irregular intervals in sequences having a short period and specific duration,
- a second phase subsequent to said first phase during which the primary signals are transmitted at high power and are timed at regular or irregular intervals in sequences having a longer period.

According to the invention, activating the individual alarm unit causes a prior stage which involves measuring the temperature of the water into which the man overboard has fallen by means of a temperature sensor housed in said individual alarm unit, this stage possibly being performed at the same time as triggering the transmission of primary signals.

According to the invention, transmission of said primary signals is triggered automatically or as a result of positive action by the man overboard.

Advantageously, there are idle intervals between two periods when primary signals are transmitted, the duration of said idle intervals possibly not being constant, in order to avoid the risk of falling in phase with the swell, and also being variable depending on the water temperature measured by the sensor.

In addition, the invention also relates to a signalling and localisation method for an individual in the sea comprising the following steps:
- establishing a network comprising a plurality of surface surveillance means, each of said means being capable of using a signalling and localisation method for an individual in the sea equipped with an individual unit, including means of personalisation as described above;
- in the event of failure to receive, for a prolonged period, ultrasonic signals transmitted by the individual unit in response to secondary ultrasonic signals, transmitting, by radio, a request to locate the individual in the sea as well as representative signals from the means of personalisation to the surface surveillance means;
- after receiving the request, triggering the use, by at least one of the surface surveillance means, of a signalling and localisation method as described above.

In other words, if the diver is separated from the surface surveillance means, such as a boat, by an obstacle or an excessively long distance, the boat makes use of a network of "re-transmitters" consisting of surface surveillance means which are on station. This increases the chances of locating an isolated diver.

In practice, the above method also comprises iterative steps involving:
- locating, at regular or irregular time intervals, an individual in the sea by using a method such as that described previously in order to plot their position;
- continuously deducing the position of the individual in the sea as a function of their previously plotted positions;
- interrogating, at regular or irregular time intervals and by radio, each of the surface surveillance means so as to store their respective positioning;
- classifying the surface surveillance means in ascending order of their respective distance from the deduced position;

transmitting the request by radio on the channel frequency of the surface surveillance means ranked in first position;

after receiving the request, triggering the use, by the surface surveillance means, of a signalling and localisation method as described above;

reiterating the above steps by interrogating the surface surveillance means in ascending order of their distance until the individual in the sea is effectively located.

In other words, the network is used to optimize the communications exchanged between the surface surveillance means.

BRIEF DESCRIPTION OF THE DRAWINGS

The invention will be more readily understood in the light of the following description of particular embodiments, reference being made to the accompanying figures. The object of the invention is, however, not confined to these particular embodiments and other embodiments of the invention are possible.

DESCRIPTION OF THE PREFERRED EMBODIMENTS

Figure 1:
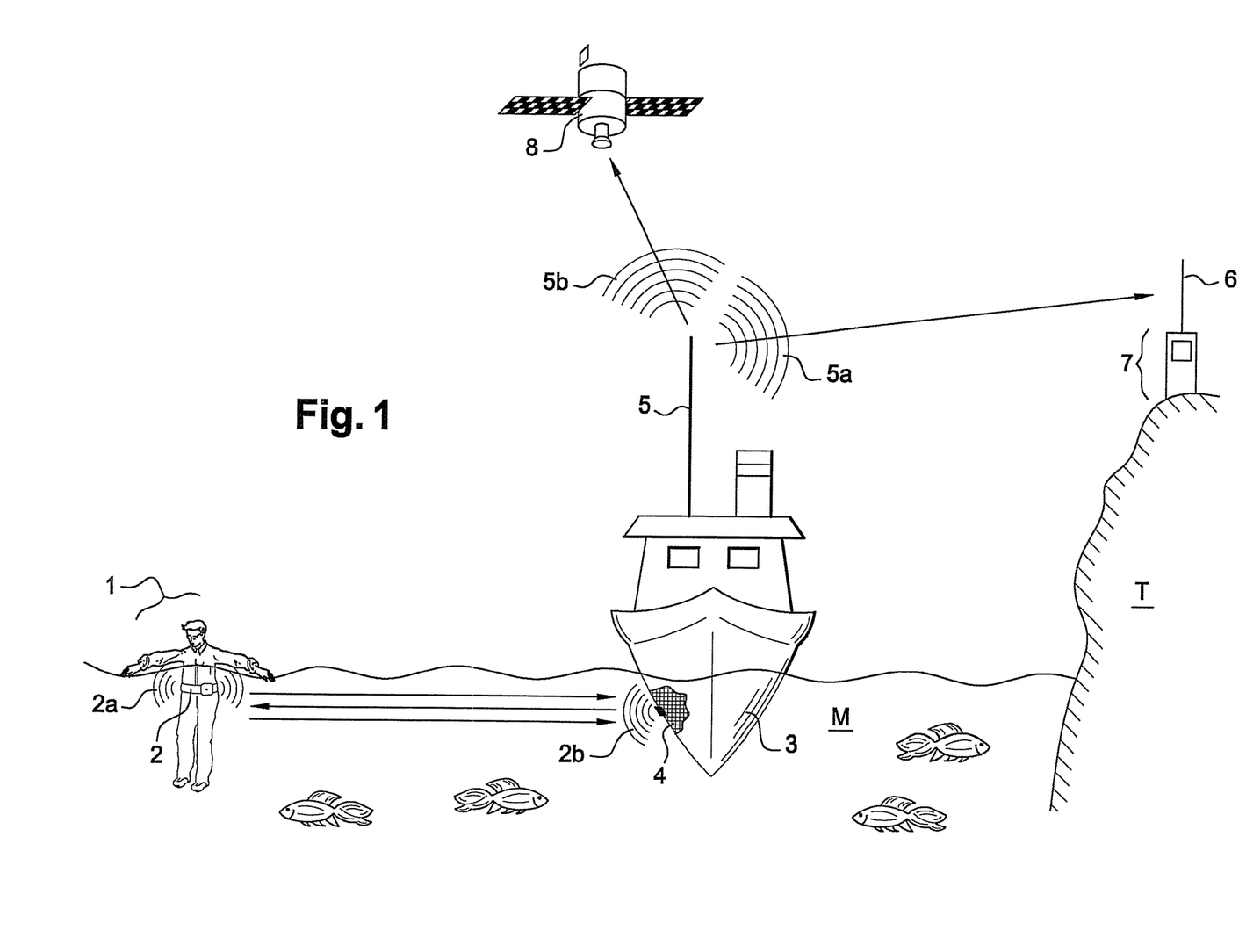
FIG. 1 is a schematic view of the operating principle of the localisation device for a man overboard in accordance with the invention.

FIG. 1 shows the use of the signalling device which is the object of the invention for rescuing a person (1) who has fallen into the sea from a ship (3). The person (1) is equipped with an individual alarm unit (2) which includes an ultrasonic wave transmitter designed to send a distress signal and enable the person to be located. This individual alarm unit (2) may be in the form of a wrist strap, a belt or be incorporated into a garment or a life jacket, thus being a non-bulky item which does not adversely affect the freedom of movement of the person wearing it in any case.

Also, individual alarm unit (2) is equipped with a watertight housing which accommodates some or all of its electrical component parts, such as a rechargeable or non-rechargeable battery in order to allow operation of said unit and, in particular, power an ultrasonic wave transmitter having a specific frequency of 30 to 60 kHz, for example. This transmitter, especially a piezoelectric transmitter, can be fitted inside the housing or simply be connected to the latter by means of a power cable. This latter configuration may prove advantageous in the case of man overboard situations in so far as the piezoelectric transmitter can be immersed in the sea to a greater depth and, consequently, the paths of the ultrasonic waves in the liquid medium are less disrupted by agitation of the sea surface which, as is known, causes cavitation phenomena. The length of the cable is typically about 1.5 m.

According to the invention, the housing of the individual alarm unit is equipped with a wet switch (not shown) which automatically triggers transmission of so-called "primary" ultrasonic signals (2a) when it is immersed in the sea. The electrical resistance of the wet switch decreases, in a known manner, when it comes into contact with water and assumes a low value because the ions in the aqueous medium ensure conduction between its two terminals.

Nevertheless, triggering of the distress signal can be activated by other automatic or manual devices (switch). In the case of a manual triggering device, the device can be made irreversible in order to prevent the risk of inadvertent switch-off.

In a first step, the primary signals are transmitted by an ultrasonic emission source or transmitter (not shown) which is part of individual alarm unit (2). This emission source consists, for example, of a piezoelectric transducer capable of isotropic transmission of a signal previously generated by a microcontroller and subsequently amplified. Such transducers capable of transmitting a signal which can be detected at a distance of approximately 1,620 nautical miles, i.e. 3 km, are currently available. Other types of known transmission can be envisaged.

These primary signals are intended to be detected by surface surveillance means (3). The latter may consist of a ship, for example the ship from which the person fell, or also a buoy dropped, for instance, from an aircraft in the presumed vicinity where the person fell into the sea or in the area where scuba divers are operating.

This surface surveillance means (3) is equipped with an antenna (4) capable of receiving primary ultrasonic signals (2a) having a specific wavelength transmitted by the transmitter built into or associated with individual alarm unit (2).

To achieve this, antenna (4) is necessarily immersed and therefore, for example, located on the keel of ship (3) or on the submerged part of a buoy.

According to one aspect of the invention, during an initial phase, primary signals (2a) are transmitted at relatively low power. In fact, if surface surveillance means (3) is ship (3) from which the person (1) wearing said transmitter fell, the person is initially close to ship (3) in question. This makes it possible to minimize the energy consumption required in order to alert the rescue facilities on board ship (3), thereby maximizing the potential amount of time for which primary signals can be transmitted.

In contrast, the primary signals are transmitted in repetitive sequences having brief and irregular idle intervals in order to maximize the chances of primary signal (2a) being received by surface surveillance means (3). The duration of the initial phase is of the order of several minutes.

The idle phase in a transmission sequence is intended to allow the antenna housed in individual alarm unit (2) to pick up a secondary signal (2b) transmitted by surface surveillance means (3). The idle phase is necessary if the relatively compact transmitter has to fulfill transmission and reception functions. The lower the water temperature, the shorter the duration of this idle phase, in order to increase the chances of detection by surface surveillance means (3), thus consequently improving the chances of picking up the person wearing the transmitter while they are still alive. The water temperature is measured at the same time as primary signals (2a) are transmitted by means of a temperature sensor housed in individual alarm unit (2).

In addition, the idle period of the repetitive sequences is variable in order to avoid interference caused by the rhythm of the swell, thereby maximizing the range of transmitted primary signals (2a). Nevertheless, it is feasible to make provision for periodic ultrasonic transmission sequences without departing from the scope of the invention.

In a second step, if surface surveillance means (3) picks up a primary signal (2a), it automatically transmits a secondary signal (2b) by using transmission means that are essentially triggered by primary signals (2a) being received by submersed antenna (4) and are incidentally triggered by an appropriate switching circuit. Then, following detection of secondary signal (2b), individual alarm unit (2) responds automatically by transmitting a reply signal.

This ultrasonic reply signal transmitted by individual alarm unit (2) is received by surface surveillance means (3) which comprises means capable of calculating the position of individual alarm unit (2) as a function of these received ultrasonic signals. At this stage, the individual alarm unit is no longer in control because the signals which it transmits consist of basic pulses, the purpose of which is to allow localisation of the person wearing unit (2) in question.

If, after a predetermined period, typically ranging from 30 seconds to 1 minute, the individual alarm unit no longer receives secondary signals (2b), indicating that it has exited the coverage area of surface surveillance means (3), said individual alarm unit regains control and retransmits signals (2a) in its original transmission mode, i.e. in accordance with its own procedure, until it once again picks up secondary signals (2b).

In addition and in order to enable correct operation of the device according to the invention, the power of primary signals (2a) transmitted by individual alarm unit (2) is advantageously similar to that of secondary signals (2b) transmitted by surface surveillance means (3) with a view to remaining in the reception or transmission area of the various units.

In a third step, surface surveillance means (3) can locate the person (1) in terms of direction and distance relative to ship (3) in accordance with known triangulation or radio direction-finding principles with the aid of various switching back and forth between the transmitted and received signals. To achieve this, surface surveillance means (3) is equipped with means capable of calculating distance and direction respectively on the basis of the transit time of ultrasonic waves in water and on the basis of differences in the intensity of signals received on various surfaces of submersed antenna (4). In fact, submersed antenna (4) consists of several ultrasonic sensors or a sensor having a surface which allows spatial discrimination of the signals transmitted by the transmitter of individual alarm unit (2). The means of calculating positions necessarily include a chronometer. In addition, they include the bearing indicated by a navigation compass and the coordinates in a global positioning system. These means determine the position of the man overboard relative to these coordinates.

In a fourth step, surface surveillance means (3) equipped with a transmission unit (5) for transmitting signals (5a, 5b) by radio, automatically reports the coordinates of person (1) thus determined in a global positioning system such as the GPS to search and rescue organization (7) on land (T). In practice, transmission of a radio signal (5a, 5b) is triggered after a predetermined time delay of approximately 30 seconds, in this case, during which the alarm signal can be cancelled by means of an alarm off switch, for example if the rescue facilities on board the ship are sufficient to rescue person (1).

Position calculations and radio signals indicating this position are reiterated for as long as the man overboard had not been rescued or for as long as the man overboard remains located in the reception range of antenna (4) of surface surveillance means (3), i.e. approximately 1,620 nautical miles. In addition, when the man overboard moves outside the reception range of the antenna, the calculation means are capable of extrapolating drifting of the individual in the sea on the basis of their calculated positions when they were within reception range. This extrapolation is necessarily imprecise, but the evidence it provides can be extremely useful.

Obviously, this time delay must be very short compared with the time for which a person who has fallen into the sea can survive.

The alarm off switch can be implemented in various ways. It may be a simple switch located on individual alarm unit (2) but, in order to avoid the alarm being inadvertently switched off by a man overboard, it is more sensible to make provision for the alarm off switch to be controlled by search and rescue organization (7) or by members of the crew of ship (3).

After the initial phase, primary signals (2a) are transmitted at higher power because currents may move man overboard (1) away from ship (3). Nevertheless, and still with the aim of maximizing economical use of available power for the transmitter of individual alarm unit (2), the transmission sequences for primary signals (2a) include idle periods that are longer than those in the initial phase. In fact, after the end of the initial phase, it is likely that rescue will be carried out by rescuers who are not necessarily in the area. As rescuers approach, person (1) may drift and localisation must therefore be repeated, less frequently but for a sufficiently long time to allow, in particular, accurate extrapolation of their position outside the reception range of antenna (4).

Also, transmission of a radio signal may be accompanied by transmission of an audible signal if surface surveillance means is a ship (3). This makes it possible to alert the crew and/or onboard rescuers.

Advantageously, the radio signal (5a, 5b) transmitted by surface surveillance means (3, 4, 5) has a wavelength suitable for reception by a global positioning system such as the GPS or Galileo systems which include tracking satellites (8). For example, the wavelength can be 406 MHz in order to transmit to the GEOSAR satellite constellation and 121.5 MHz or 406 MHz to transmit to the LEOSAR satellite constellation.

Having picked up the radio signal, satellite (8) in turn retransmits it to search and rescue organization (7) which must obviously be equipped with an appropriate antenna (6). Nevertheless, the radio signal can also be received directly by search and rescue organization (7) or even by another surface surveillance means in cases where the latter are located close to the man overboard and capable of assisting him.

Moreover, the format of the radio signal can be any of the known standardized digital formats such as VHF DSC (Very High Frequency Digital Selective Calling), Single Side Band (SSB) or GSM (Global System for Mobile communication). The transmit channels may also vary depending on the area of use and/or the individual alarm unit used. Note that the DSC format is particularly suitable for the applications of the present invention for alarm systems because it is used by the Global Maritime Distress and Safety System (GMDSS).

Optionally, individual alarm unit (2) and/or surface surveillance means (3) and/or the radio signal receiver(s) (satellite (8), emergency station (7)) respectively may comprise a non-volatile memory intended for recording the parameters of the signals (in particular their chronology) transmitted and received ultrasonically and/or by radio. The non-volatile memories act as "black boxes". In addition, these memories may include means of personalising said individual alarm unit, thus making it possible to ascertain the identity of man overboard (1) quickly and, if applicable, distinguish several distress signals which are transmitted simultaneously. This personalisation means may, however, be a result of the code number traditionally assigned to the integrated circuit accommodating the various components of the units or devices in question.

The personalisation means thus makes it possible to check that the person rescued and hoisted on board is actually wearing transmitter (2) identified by surface surveillance means (3). If the rescued person is not wearing the transmitter, this means that there is another man overboard (1). In practice, this check is made by moving individual alarm unit (2) close to surface surveillance means (3) so that they enter into radio contact and/or contact by proxy; to achieve this, individual alarm unit (2) must obviously be fitted with an appropriate transmitter.

The signalling device or signalling method according to the present invention is equally suitable for both professional seafarers (fishing boats, merchant navy, offshore oil rigs, biologists tracking animals etc.) and amateurs (windsurfers, yachtsmen, bathers etc.). It also obviously has applications on lakes or other stretches of water. In so far as localisation of a man overboard is not achieved by sight, the device or method also allows localisation by day and by night.

The device according to the invention is not bulky, is capable of transmitting while submersed and is fast because it is automatic because distress signal (2a) is relayed without human intervention to search and rescue organization (7).

The device or method according to the invention also has applications for locating scuba divers, especially those belonging to the same boat or the same group of divers. In fact, it is often necessary for a crew to accurately locate divers because divers rarely exit the water in the same place where they entered it and, in particular, they tend to drift as they ascend to the surface because of currents which can move them over sometimes considerable distances without them being aware of this.

Figure 2:
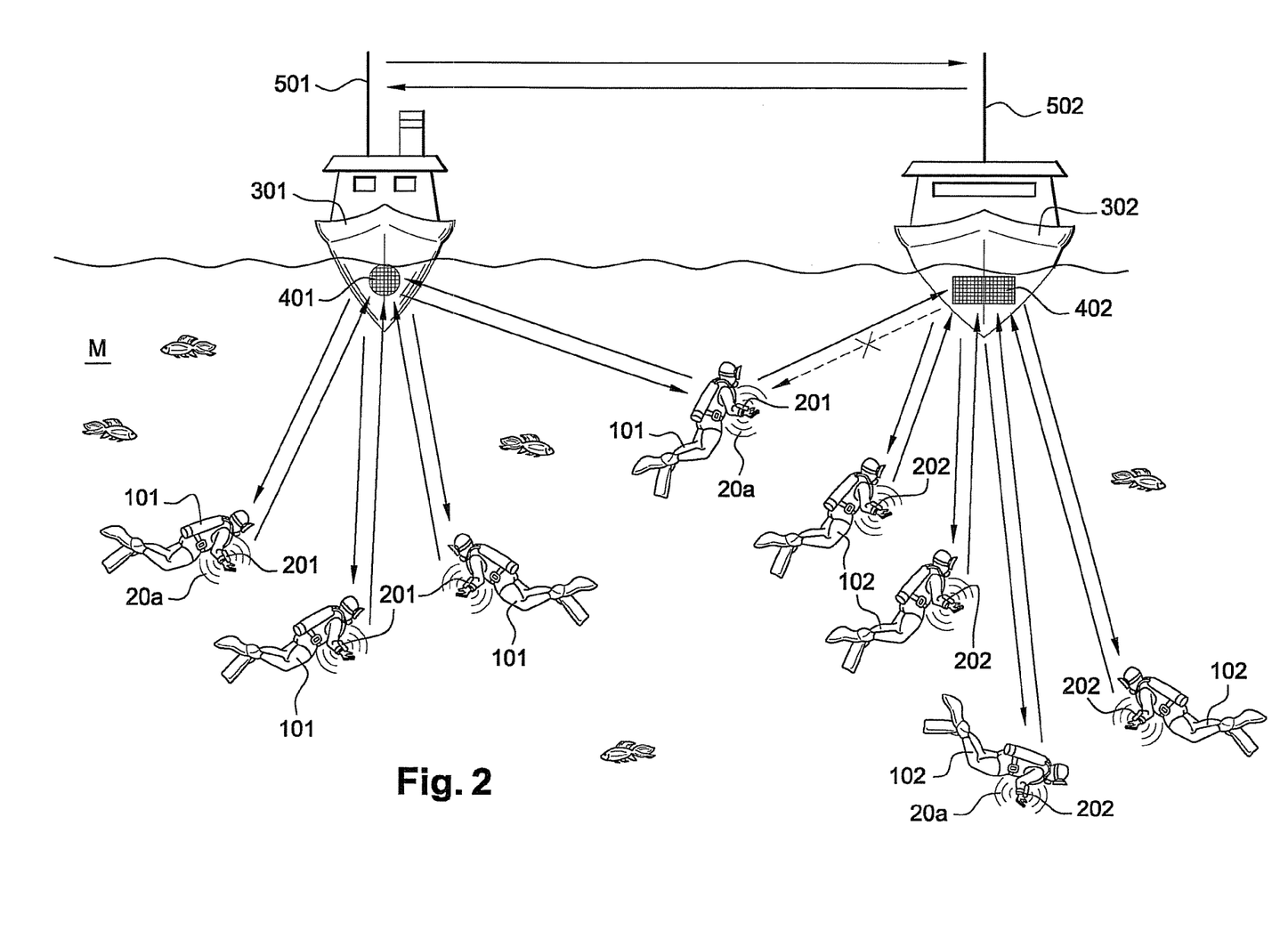
FIG. 2 is a schematic view of the principle of the invention in the more particular context of scuba divers.

To allow localisation, each diver (101, 102) is equipped with a transmitter which can be built into or added to their dive computer (201, 202) or an item of clothing. The operation of the device and the sequencing of the method, in particular as far as the transmission and reception of ultrasonic signals is concerned, are similar to those described above.

In addition, integrating said transmitter into the dive computer optimizes the device's interactivity for communications between divers and the boat with which they are associated. This man-machine interactivity can be enhanced further still on said boat where it is possible to envisage visual retranscription of various parameters and information.

Adapting the device and the method according to the invention to diving nevertheless involves specific features which reflect differences in the situations of the persons to be located. The transmitter of each diver (101, 102) can also be incorporated in an apparatus intended to measure the diver's depth and transmit it to the microprocessor which generates ultrasonic signals (20a) in order to communicate this depth by means of surface surveillance, in this case ships (301, 302) which are equipped with an appropriate antenna (401, 402). The interactive nature of the device, which is especially useful in connection with scuba diving, should be emphasized at this point.

In addition, in order to locate each diver, the surface surveillance means of these ships (301, 302) are equipped with calculation means such as those described above which are capable of determining, on the basis of signals received on each ultrasonic antenna (401, 402), the coordinates of each diver in a global positioning system such as the GPS. The crew of ship (301, 302) is thus capable of directing ship (301, 302) so that it is always located at a reasonable distance away from the diver(s) (101, 102). Groups of divers are organized and their safety is ensured effectively in this way.

The frequencies of the ultrasonic signals used must be different to the distress frequency used when the invention is used for search and rescue. Nevertheless, each diver can be equipped with a separate individual alarm unit or an individual alarm unit incorporated in his or her dive computer (201, 202), said unit then being capable of transmitting on the distress frequency.

Signals (20a) correspond to primary signals (2a) mentioned above. They can have frequencies that are specific to each ship (301, 302) or even each diver. Advantageously, each transmitter comprises personalisation means such as those mentioned above in order to distinguish the divers from each other or at least each have a number which characterizes their transmitter. It is then necessary to make provision for a reconnaissance phase on the bridge of the ship (301, 302) in the form of a radio signal, for example, which transmits the number of each transmitter to the surface surveillance means.

As soon as immersion occurs, surface surveillance means on board ship (301, 302) receives ultrasonic signals which coincide with those received during the reconnaissance phase.

For its part, the surface surveillance means on board ship (301, 302) can transmit information, in particular localisation information, to each diver via an ultrasonic transmitter. The individual dive computers (201, 202) make it possible to display this information via a man-machine interface such as a screen.

The radio transmitter (501, 502) of the ship (301, 302) makes it possible to exchange the positions of divers who belong to different groups of divers of several nearby ships (301, 302) and, on this basis, ensure the safety of these divers (101, 102).

Figure 3:
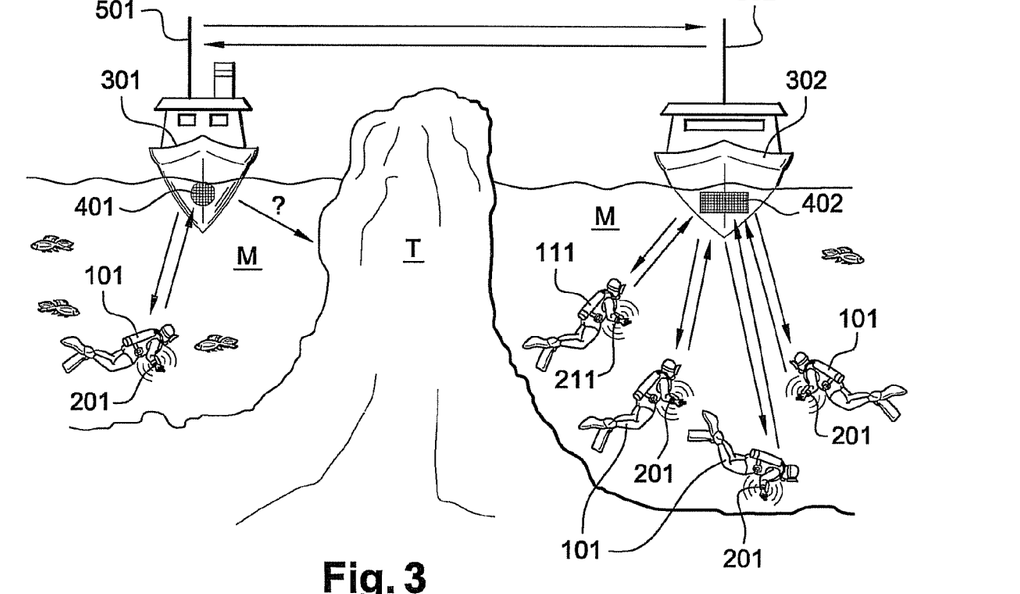
FIG. 3 is a schematic view of another embodiment of the invention, also in the particular context of scuba divers.

FIG. 3 shows another embodiment of the invention. In this embodiment, it is possible to locate scuba divers (111) from a surface surveillance means such as a boat (301) despite an excessive distance or despite the presence of obstacles such as a rock (T) which prevent the propagation of ultrasonic signals. In this case, the means of transmitting secondary ultrasonic signals (2b) of boat (301) regularly send requests to transmit to the individual dive computers (211) in order to determine the position of the divers (101, 111). However, if there is an obstacle (T), the individual computer of an isolated diver (111) will not receive the ultrasonic carrier waves of such a request or interrogation and, consequently, will not respond to it so that the calculation means of boat (301) will not be able to determine the position of this diver (111).

Ultrasound cannot propagate through a solid obstacle unless the transmitter is in contact with the obstacle and transmits at an appropriate frequency. Because both these conditions cannot be met in the embodiment shown in FIG. 3, boat (301) is not normally capable of locating a diver (111) who is a member of a group of divers but is isolated by such an obstacle (T) or due to excessive distance.

Nevertheless, using this embodiment of the invention, it remains possible to locate an isolated diver (111). To achieve such localisation, surface surveillance means (301) makes use of a network of surface surveillance means such as boat (302) which is located "on station", i.e. close to isolated diver(s) (111). This "network" of surveillance means can thus help surveillance means (301) locate one or more isolated divers (111).

Prior to doing so, boat (301) must identify, by communication, all the surface surveillance means (302) which are located "on station" and are consequently qualified as "compatible". It then records the coordinates of these compatible surveillance means (302) and updates these coordinates at regular intervals.

When one of the divers (111) equipped with an individual unit (201) becomes isolated, either by an obstacle (T) or because they are farther away than the ultrasonic communication range, boat (301) no longer receives the ultrasonic signals that are distinctive of the invention and transmitted in response to its ultrasonic interrogating signals. In fact, the individual apparatus (211) of isolated diver (111) no longer transmits signals because it can no longer receive interrogating signals from boat (301). After a given number of unsuccessful interrogation attempts, boat (301) changes to a localisation mode which uses the "network" of compatible surveillance means (302).

In order to locate isolated diver (111), boat (301) determines the surface surveillance means (302) which is closest to isolated diver (111) on the basis of the previously recorded and regularly updated coordinates of each of the compatible surveillance means (302) which constitute said network.

It then sends a request to interrogate the individual apparatus (211) of isolated diver (111) to the surveillance means (302) thus determined. To achieve this, boat (301) communicates the identification number specific to this individual apparatus (211) as well as the identifier of the surface surveillance means (301) which originated the localisation request (in this case its own identifier), the frequency channel to be used for communications etc.

Because it knows the identification number of the individual apparatus (211) of isolated diver (111), relay boat (302) is capable of distinguishing it from other individual apparatuses (201) during interrogation, thus locating the isolated diver (111). It can then calculate the position of this diver (111) by determining his coordinates in a global positioning system and then communicating these coordinates by radio to the interrogating boat (301). Compatible surface surveillance means (302) thus acts as a relay for interrogating boat (301) because it relays the latter's interrogation signals.

Interrogating boat (301) is thus capable of locating one or more isolated diver(s) (111) despite the fact that he or they are located an excessive distance away or despite the presence of obstacles. Obviously, boat (301) can also exchange other information with the individual apparatus (211) of isolated diver(s) (111) in the same way. It can, in particular, inform diver (111) that he is isolated.

Besides this, the "network" interrogation protocol can make provision for additional interrogation if the first compatible surface surveillance means (302) does not succeed in locating the isolated diver (111). In such a case, interrogating boat (301) and/or its relay (302) can request interrogation by a second or third etc. compatible surface surveillance means until the coordinates of the isolated diver are ascertained.

This network interrogation protocol comprises various steps.

Firstly it involves establishing a network comprising a plurality of surface surveillance means (302), each of said means being capable of using a signalling and localisation method for an individual in the sea (111) equipped with an individual unit (211) which includes means of personalisation.

In the event of failure to receive, for a prolonged period, ultrasonic signals which, if there was no obstacle, should have been transmitted by individual unit (211) in response to secondary ultrasonic signals, boat (301) transmits, by radio, a request to locate the individual in the sea (111) as well as representative signals of the means of personalisation to surface surveillance means (302).

After receiving the request, the use, by at least one of the surface surveillance means (302), of a signalling and localisation method in accordance with the invention is triggered.

More especially, this protocol comprises the following iterative stages:

Locating, at regular or irregular time intervals, the individual in the sea (111) by using a signalling and localization method in accordance with the invention in order to plot their position.

Continuously deducing the position of the individual in the sea (111) as a function of their previously plotted positions.

Interrogating, at regular or irregular time intervals and by radio, each of the surface surveillance means (302) so as to store their respective positioning.

Classifying the surface surveillance means (302) in ascending order of their respective distance from the deduced position.

Transmitting the request by radio on the channel frequency of the surface surveillance means (302) ranked in first position.

After receiving the request, triggering the use, by at least one of the surface surveillance means (302), of a signalling and localisation method in accordance with the invention.

Reiterating the above steps by interrogating the surface surveillance means in ascending order of their distance until the individual in the sea is effectively located.

Figure 4:
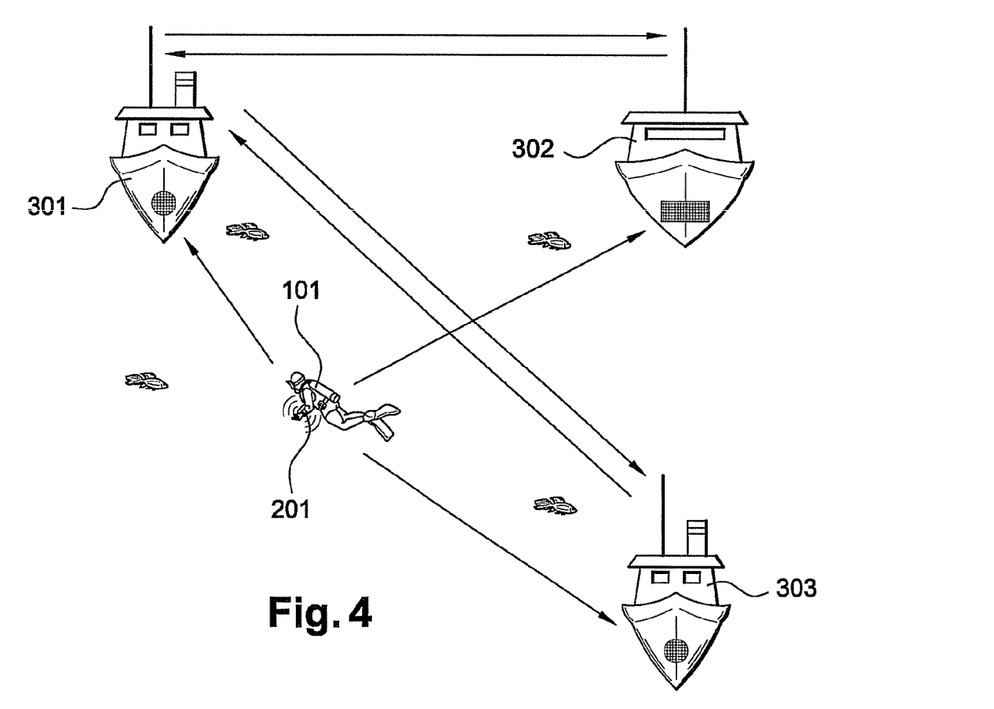
FIG. 4 is a schematic view of another different embodiment of the invention.

This "networked" operation also makes it possible to implement another embodiment of the invention shown in FIG. 4 where the interrogating boat (301) requires assistance from at least two compatible surface surveillance means (302, 303) in order to accurately locate an individual in the sea or a diver in distress (101) by triangulation. Communication between the surface surveillance means takes place in the same way as in the embodiment described above. In fact, for safety reasons, individual apparatus (201) is fitted with a device for measuring depth or a depth meter and it can therefore communicate its depth to boat (301). In this way, once each of the three surface surveillance means (301-303) has communicated its position in GPS coordinates and the distance between it and individual apparatus (201), interrogating boat (301) can accurately determine the position of individual apparatus (201).

Since the distance and depth of individual apparatus (201) are known, the angular position of diver (101) relative to the boat is clearly defined. This position is then determined by the respective distances, measured by two additional boats (302, 303), between them and the diver (101).

In other words, the position of the diver is located at the point where three circles formed by intersections of the horizontal plane located at the depth of diver (101) intersect respectively with each of three spheres centred at sea level in the location of each of the three boats (301-303), the respective radii of which equal the distances measured respectively by each of the three surface surveillance means (301-303).

The invention claimed is:

1. A signalling and localisation device for an individual in the sea, comprising:
- an ultrasonic wave transmitter constituting an individual alarm unit carried by the individual in the sea, or likely to fall into the sea, designed to produce isotropic radiation of carrier waves of primary signals;
- a surface surveillance means arranged on the surface of the sea and provided with:
- a submersed antenna capable of picking up the primary signals transmitted by individual alarm unit;
- means of transmitting secondary ultrasonic signals, this means of transmission being triggered essentially by submersed antenna receiving primary signals;
- means capable of calculating the position of individual alarm unit as a function of the ultrasonic signals received in response to secondary ultrasonic signals and of converting this information into coordinates of a global positioning system;

a unit for transmitting radio waves capable of sending signals representing these coordinates to a mobile or fixed alarm processing center equipped with a radio receiver.

2. A signalling and localisation device for an individual in the sea as claimed in claim 1, wherein the antenna with which surface surveillance means is equipped is a multiple antenna or has a specific surface area.

3. A signalling and localisation device for an individual in the sea as claimed in claims 1, wherein the individual alarm unit is equipped with:
   means of automatically or manually triggering the transmission of primary ultrasonic signals;
   means of automatically triggering ultrasonic signals in response to the secondary signals transmitted by surface surveillance means.

4. A signalling and localisation device for an individual in the sea as claimed in claim 3, wherein the means of automatically triggering ultrasonic transmission comprise a system capable of detecting the immersion state of at least one area of individual alarm unit.

5. A signalling and localisation device for an individual in the sea as claimed in claims 1, wherein the individual alarm unit comprises:
   a self-contained rechargeable or non-rechargeable electric power source;
   an ultrasonic wave emission source;
   a depth measuring unit;
   a microprocessor;
   a temperature sensor capable of measuring the temperature of the water and reporting it to the microprocessor;
   a non-volatile memory designed to record the-parameters of the transmitted I and received signals.

6. A signalling and localisation device for an individual in the sea as claimed in claim 5, wherein the non-volatile memory also comprises means of personalising said unit.

7. A signalling and localisation device for an individual in the sea as claimed in claims 1, wherein the surface surveillance means is attached to a buoy or a surface vessel and has a submerged part which accommodates the antenna(s) that transmit(s) and receive(s) ultrasonic waves and a non-submerged part which accommodates the means of radio transmission.

8. A signalling and localisation method for an individual in the sea comprising:
   deliberately or automatically, depending on prevailing circumstances, causing activation of an individual alarm unit carried by a person who is in the sea so as to trigger isotropic transmission of primary signals using ultrasonic waves;
   picking up said primary signals and, in return, producing secondary ultrasonic signals which, in response, automatically trigger the transmission of ultrasonic signals so as to enable localisation of the individual in the sea carrying individual alarm unit which transmits said primary signals;
   processing the ultrasonic signals received in response to secondary ultrasonic signals n order to determine the position of the individual in the sea as coordinates of a global positioning system;
   transmitting signals that represent these coordinates by radio so as to indicate the location of the individual in the sea and, if applicable, trigger ad hoc search and rescue operations.

9. A signalling and localisation method for an individual in the sea as claimed in claim 8, wherein the transmission of primary signals comprises two successive phases:
   a first phase which starts immediately after activation of the individual alarm unit during which primary signals are transmitted at low power and are timed at regular or irregular intervals in repetitive sequences having a short period and specific duration;
   a second phase subsequent to said first phase during which primary signals are transmitted at higher power and are timed at regular or irregular intervals in repetitive sequences having a longer period.

10. A signalling and localisation method for an individual in the sea as claimed in claims 8, wherein activating the individual alarm unit causes triggering of a prior stage which involves measuring the temperature of the water in which the individual in the sea is immersed by means of a temperature sensor housed in said individual alarm unit, this stage possibly being performed at the same time as triggering the transmission of primary signals.

11. A signalling and localisation method for an individual in the sea as claimed in claim 10, wherein there are idle intervals between two periods when primary signals are transmitted, the duration of said idle intervals depending on the water temperature measured by the sensor.

12. A signalling and localisation method for an individual in the sea as claimed in claims 8, wherein the transmission of said primary signals is triggered automatically or as a result of positive action by the individual in the sea.

13. A signalling and localisation method for an individual in the sea comprising: establishing a network comprising a plurality of surface surveillance means, each of said means being capable of using a signalling and localisation method, as claimed claims 8, for an individual in the sea equipped with individual unit which includes means of personalisation;
   in the event of failure to receive, for a prolonged period, ultrasonic signals transmitted by individual unit in response to secondary ultrasonic signals, transmitting, by radio, a request to locate the individual in the sea as well as representative signals from said means of personalisation to said surface surveillance means;
   after receiving said request, triggering the use, by at least one of said surface surveillance means, of a signalling and localisation method as claimed in claims 8.

14. A signalling and localisation method for an individual in the sea as claimed in claim 13; further comprising:
   locating, at regular or irregular time intervals, an individual in the sea by using a method as claimed in 8 in order to plot their position;
   continuously deducing the position of the individual in the sea as a function of their previously plotted positions;
   interrogating, at regular or irregular time intervals and by radio, each of said- surface surveillance means so as to store their respective positioning;
   classifying said surface surveillance means in ascending order of their respective distance from the deduced position;
   transmitting said request by radio on the channel frequency of surface surveillance means ranked in first position;
   after receiving said request, triggering the use, by said surface surveillance means (302), of a signalling and localisation method as claimed in claims 8;
   reiterating the above steps by interrogating the surface surveillance means in ascending order of said distance until the individual in the sea is effectively located.

* * * * *